United States Patent [19]

Johnston

[11] 3,898,744
[45] Aug. 12, 1975

[54] CONSTANT PRECESSED GYROCOMPASS
[75] Inventor: James V. Johnston, Huntsville, Ala.
[73] Assignee: The United States of America as represented by the Secretary of the Army, Washington, D.C.
[22] Filed: Feb. 12, 1974
[21] Appl. No.: 441,928

Related U.S. Application Data
[63] Continuation-in-part of Ser. No. 303,896, Nov. 6, 1972, abandoned, which is a continuation-in-part of Ser. No. 855,468, Sept. 3, 1960, abandoned.

[52] U.S. Cl. .................................... 33/324; 74/5.4
[51] Int. Cl.² ...................................... G01C 19/36
[58] Field of Search ........ 33/324, 321; 75/5.4, 5.47, 75/5.6

[56] References Cited
UNITED STATES PATENTS

| | | | |
|---|---|---|---|
| 2,925,736 | 2/1960 | Mueller | 74/5 X |
| 2,926,530 | 3/1960 | Mueller et al. | 74/5.47 |
| 2,981,113 | 4/1961 | Erdley | 74/5.4 |
| 3,071,012 | 1/1963 | Baring-Gould | 33/321 UX |
| 3,146,530 | 9/1964 | Clark et al. | 33/321 |
| 3,223,851 | 12/1965 | Kitchen et al. | 307/88.5 |
| 3,237,313 | 3/1966 | Gevas | 33/321 UX |
| 3,301,071 | 1/1967 | Shalloway | 74/5.6 |
| 3,307,412 | 3/1967 | Grangvist | 74/5.6 |
| 3,308,670 | 3/1967 | Grangvist | 33/321 UX |
| 3,561,129 | 2/1971 | Johnston | 33/324 |
| 3,619,906 | 11/1971 | Yates et al. | 33/324 |

Primary Examiner—William D. Martin, Jr.
Attorney, Agent, or Firm—Robert P. Gibson; Nathan Edelberg; Aubrey J. Dunn

[57] ABSTRACT

A gyrocompass using an integrating gyro mounted on a platform rotating in a plane to which a local earth gravity vector is normal. The platform is rotated about an axis coincident with the output axis of the gyro with the spin axis and input axis in a plane parallel to the platform. The gyro is supported on the platform by an air bearing. As the platform rotates, an output is produced by the incipient relative motion of the gyro. This output is amplified and used to torque the gyro housing toward a null position with respect to the platform. The gyro is mechanically decoupled from the platform, but is constrained by the torquer to rotate with the platform. The rotation of the earth causes an output rotational tendency of the gyro, with the direction of the opposing or constraining torque dependent on the direction of the spin axis of the gyro. The average value of this torque is zero. The amount by which the average measured torque varies from zero is the measure of the bias torque resulting from friction, mass unbalance, etc. This device determines the true zero cross-over points of the torque. From these points a north-south line can be established.

3 Claims, 4 Drawing Figures

PATENTED AUG 12 1975

3,898,744

SHEET 1

CONSTANT PRECESSED GYROCOMPASS

CROSS REFERENCE TO RELATED APPLICATION

This application is a continuation-in-part of earlier filed application Ser. No. 303,896, filed Nov. 6, 1972, now abandoned, which application was a continuation-in-part of application Ser. No. 855,468, filed Sept. 3, 1960, now abandoned.

BACKGROUND OF THE INVENTION

This invention is in the field of gyrocompasses. Various forms of gyrocompasses are well known in the art. Perhaps the best known in a gyrocompass which uses a space-stable rotor with its spin axis aligned to an earth meridian. This sort of gyrocompass must be set from a known north-south line, and cannot be started up and used of itself to establish such a line. Another type of gyrocompass senses the magnetic field of the earth and may include compensation for deviation. Yet another type of gyrocompass is that using pendulous system. In this system, the gyro is allowed to oscillate back and forth across a north-south meridian. When the system comes to rest, error torques about the vertical axis will hold the gyro off north. These torques cannot readily be determined, and are usually assumed as being constant. The instant invention overcomes the disadvantages of the prior art gyrocompasses.

SUMMARY OF THE INVENTION

An integrating gyro is mounted on a level platform and mechanically decoupled therefrom by an air bearing. The platform is rotated about the output axis of the gyro, with the spin axis and the input axis of the gyro in a plane parallel to the platform. The torque necessary to make the gyro follow the platform is averaged for each revolution of the platform. This torque includes an earth torque, which averages zero, and bias torque from friction, mass unbalance, etc. The average output torque is thus unequal to zero, but is the measure of the bias torque. The average torque is used, together with the apparent torque zero cross-over, to determine the true zero cross-over points of torque. These points define a north-south line. It should be understood that the torque to counter the Coriolius acceleration produced by the rotation of the earth may be defined as positive for one half of each revolution of the gyro, and negative for the other half.

DESCRIPTION OF THE PREFERRED EMBODIMENT

Figure 1:
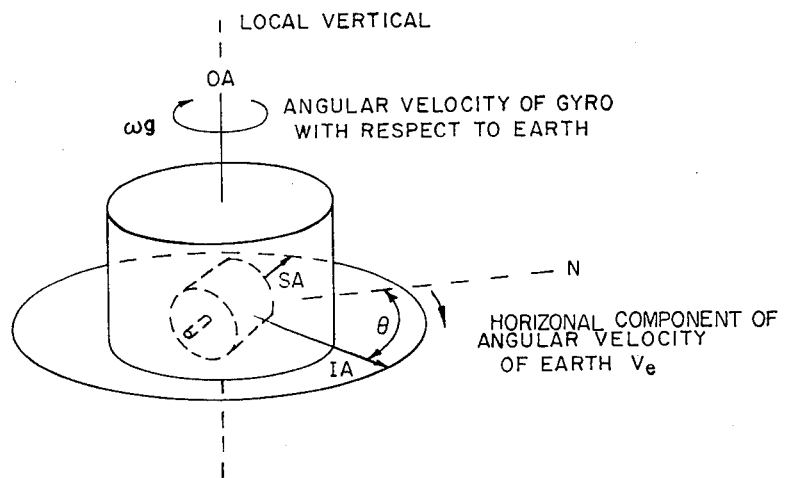
FIG. 1 is a partly schematic representation showing some of the forces involved in the invention.

Reference should first be made to FIG. 1 for an understanding of the forces involved in the invention. The IA-SA plane on the figure is a plane to which a local earth gravity vector (vertical) is perpendicular. This plane contains the input axis (IA) and spin axis (SA) of gyro 1. The gyro instrument housing is rotated about its output axis (OA), which output axis is parallel to the local vertical. The gyro is rotated relative to the earth about a vertical axis at an angular velocity $\omega_g$. North is generally toward the right in FIG. 1, with the angular velocity of the earth $V_e$ in a vertical plane containing the north-south line. $\theta$ represents the angle between the IA of the gyro and the north-south line. As the gyro rotates at $\omega_g$, this rotation is alternately opposed and aided by the precessive effect of $V_e$ depending on $\theta$. Zero cross-over points, in response to earth's rotation, occur when the SA is on the north-south line, if bias is ignored.

Figure 2:
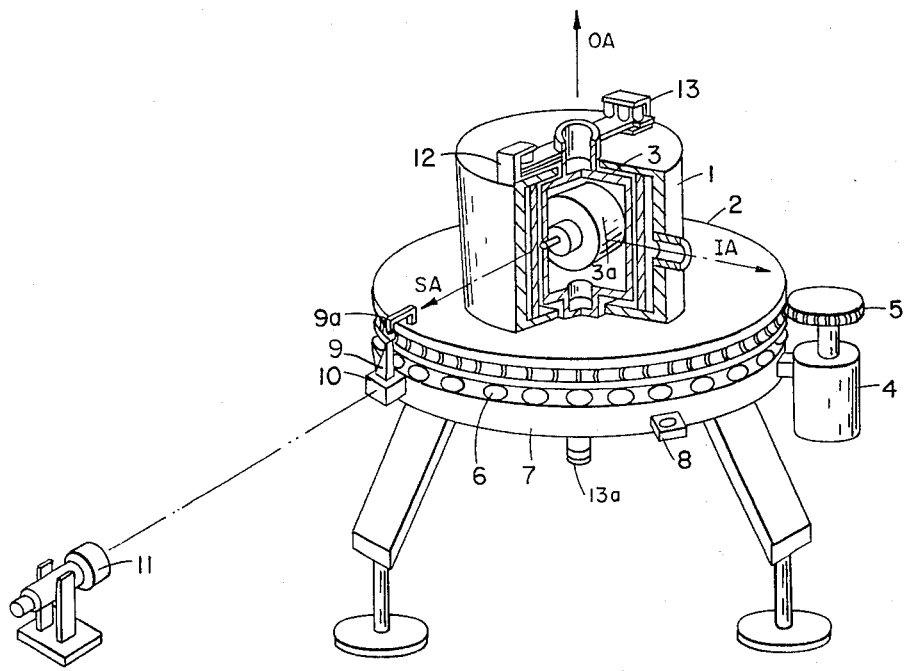
FIG. 2 is a partly schematic view of the mechanical set-up of the invention.

The mechanical set-up of the invention as shown in FIG. 2 includes a single-degree-of-freedom gyro in outer housing 1 mounted on platform 2. This platform is level or in a plane generated by rotation of a normal about the local gravity vector, and is rotated at a constant velocity about the output axis of the gyro. Inner cylinder 3 of the gyro carries rotor 3a and is mechanically decoupled from outer housing 1 by an air bearing between the two. As the platform rotates, the gyro will produce an output signal. This signal produces a torque that is used to torque the inner cylinder 3 of the gyro to a null position with respect to outer housing 3 and platform 2. The inner cylinder 3 of the gyro, in effect, follows platform 2 and rotates at the same angular velocity. The gyro of FIG. 2 is similar to the gyro as shown in U.S. Pat. No. 2,925,736 of Feb. 23, 1960 to Mueller. This patent shows and describes the action of an air bearing supporting a gyro casing.

The IA and SA are in a plane parallel to the platform. As the gyro rotates about its output axis, the gyro input axis will be aligned to north at one instant and 180° later will be aligned to south. The angular velocity about the output axis relative to the base is maintained constant. When the gyro input axis is aligned to north, the effect of the earth's angular velocity will cause a positive rotational tendency about the output axis. When the input axis is pointed to south, the earth's rate velocity component along the input axis will be exactly reversed, causing a negative rotational tendency to be applied about the output axis. When a torque is applied about the input axis of a single-degree-of-freedom rate integrating gyro, the gyro will attempt to precess about its output axis. However, in the device to be described, this precessional motion is opposed through the use of a rebalance system which causes the gyro pick-off to maintain a null condition.

In FIG. 2 reference numeral 4 shows a synchronous speed motor which, through gear 5, causes platform 2 and gyro 1 to rotate at a constant angular velocity. Platform 2 is supported on ball-bearings 6 and base 7. Bubble levels are provided as numeral 8 so that the output axis of the gyro can be placed parallel to the local vertical gravity. A position indicator is provided at 9 which provides an electrical signal each time platform 2 is rotated 360°. A reference mirror or prism 10 is fixed on the base so that an optical sighting device 11 can autocollimate on the reflector and be provided with a sighting line from which the gyro and its electronics will determine true north. Indicator 9 is mounted on mirror 10 and both are circumferentially adjustable on base 7. The manner by which autocollimation of a gyrocompass may be accomplished is taught in U.S. Pat. No. 3,146,530 issued Sept. 1, 1964, in which the instant inventor was a joint inventor.

Figure 3:
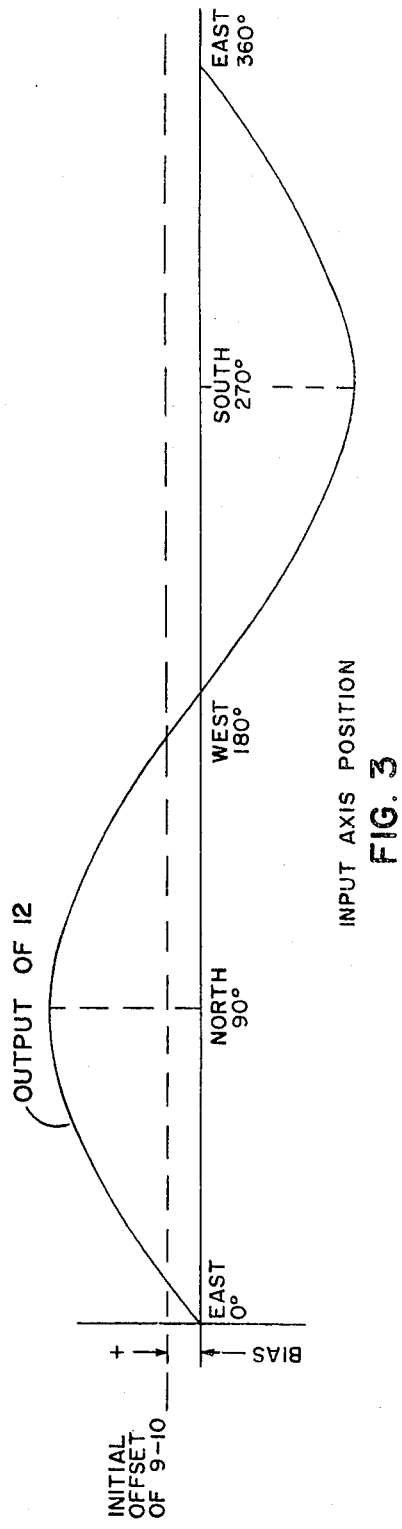
FIG. 3 is a waveform of signal generator output vs input axis position of the gyro.

FIG. 3 shows a plot of the constraining torque that would be applied to the inner cylinder 3 about the output axis of the gyro as the input axis is rotated through a 360° angle. A bias torque is shown as a solid line paralleled to the dotted zero line. The resultant oscillating torque caused by the gyro's movement about the vertical axis averages to zero around this value. All gyros exhibit some form of error torque. The basic problem is that the amount of magnitude of this torque changes with time. The proposed device allows the system to measure this bias in one complete revolution and determine what its actual value is, thereby providing an averaging technique for a gyro-compassing system. A block diagram of the system is shown in FIG. 4.

Figure 4:
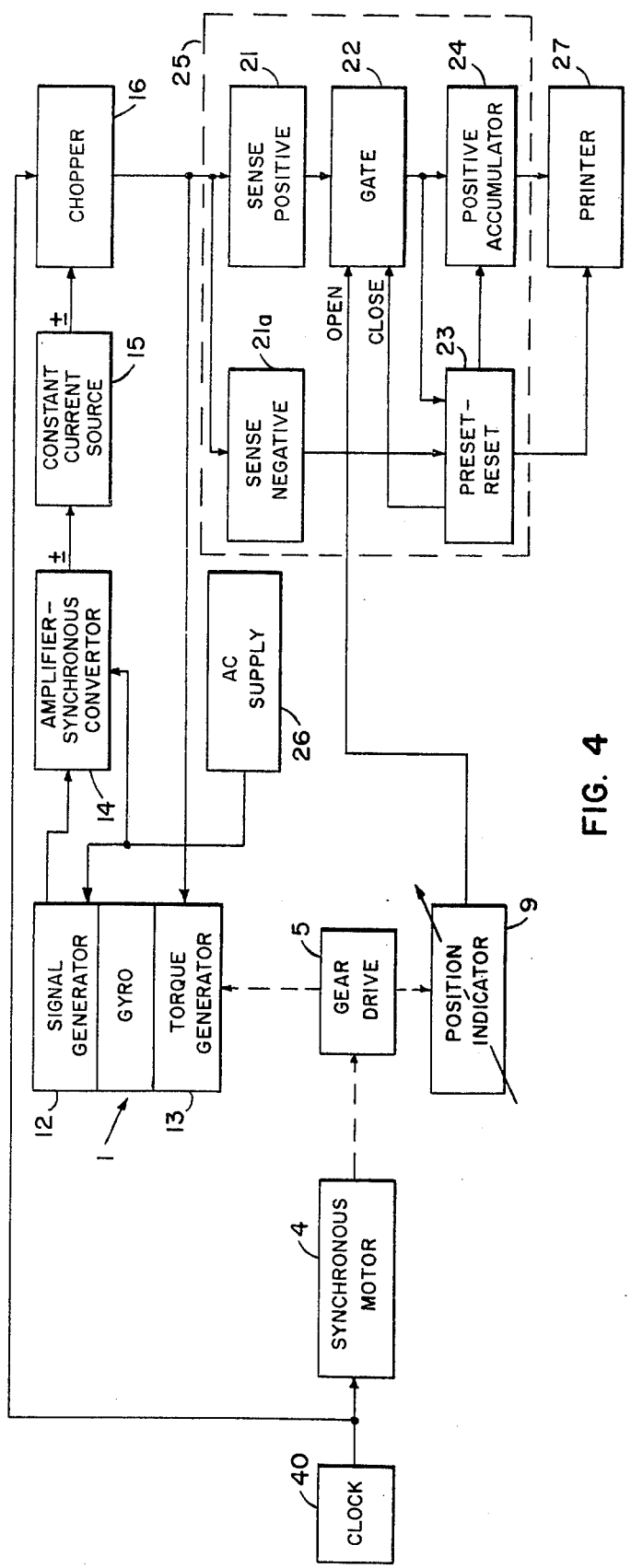
FIG. 4 is a schematic diagram of the invention.

As can be seen in FIG. 4, motor 4 is powered by clock 40. This clock also controls element 16, yet to be described. Signal generator 12 of gyro provides an output that is proportional to the displacement of the inner cylinder 3 (FIG. 2) relative to the gyro outer housing 1 (FIG. 2). The generator is fed by A-C supply 26. This signal is amplified and synchronously converted to D.C. by element 14. Element 14 includes a synchronous converter fed by 26. The D.C. signal is then passed through a constant current source 15 (paralleled + and − Schmitt Triggers or the like) which, in conjunction with chopper 16 provides constant magnitude pulses, the number of which is proportional to the incipient displacement angle of the signal generator. These pulses are then passed to the gyro torquer shown as element 13, which causes the output axis to rotate in a manner to null the signal generator. This is a standard pulse-on-demand rebalance system for a single-degree-of freedom rate integrating gyro. Many such systems are well defined and developed. The pulses that are set to torque generator 13 are also sent to sensors 21 and 21a of positive and negative pulses in preset accumulator 25. Various known preset accumulators may be used for 25; a typical example being the Model 6015 by Beckman Instruments, Inc., Berkeley Division, Richmond, California. The positive pulses from 21 pass to bistable gate 22. The gate is turned on by a pulse from position indicator 9. This indicator may take various forms, a typical example being a photocell in element 9 carried on base 7. This photocell can be illuminated by a light carried on the end of element 9a on platform 2. In the usual manner, the photocell may be covered by 9 except for a thin slit. As stated previously, 9 (and 10) are circumferentially adjustable on base 7. Mirror 10 will be so mounted that it remains normal to any line perpendicular to the axis of rotation of base 2 (OA). Obviously, pickup 12 will provide an output which is the algebraic sum of platform rotation and gyro OA rotation. That is, 12 will provide an output composed of two components. One component comes from the fixed bias in the system. The other comes from the rotational tendency about the OA introduced by the earth's rate about the IA. With the platform rotating at a constant rotational speed, no torque is required to maintain this speed, since the gyro will act as an inertial mass since it is free only about OA.

The operation of 25 is as follows: preset-reset unit 23 is preset to half the number of pulses produced by chopper 16 for each revolution of gyro 1. Gate 22 is opened by a pulse from position indicator 9 and allows positive pulses to pass to positive accumulator 24 and preset-reset unit 23. Negative pulses from 21a also pass to 23. When 23 has received a number of positive or negative pulses equal to its preset number, it closes gate 22, allows the accumulator to dump to printer 27 and to clear, and simultaneously energizes printer 27. The number shown by printer 27 is indicative of how far position indicator 9 is from the N-S line; 9 is manually adjusted (i.e., 9 and 10 are moved circumferentially on 7) until printer 27 shows a zero count from 24. When 27 shows a zero count, this indicates that 9 is in such a position on 7 that its output pulse is occurring at west on FIG. 3. Mirror 10 is thus in an east-west plane, and a north-south line can be established by autocollimation with telescope 11. When one manually adjusts 9, one in effect moves the dotted line of FIG. 3 to make it coincide with the 0 line of the figure.

The outstanding advantage of the inventive system is that it is not sensitive to bias changes as long as the bias is constant over each revolution of platform 2. This platform could be rotated at rates as low as 1 revolution per minute, thereby allowing loose tolerances on the gyro bias stability. It should be understood that the rotating head of the gyro is equipped with slip rings as shown at 13a on FIG. 2.

I claim:

1. A constant precessed gyrocompass including: a level platform about a first axis; an integrating gyro mounted on said platform and including an outer housing fixed to said platform and an inner cylinder carrying the rotor of said gyro, said inner cylinder, rotatable with respect to said outer housing parallel to the plane of said platform, said gyro having an input axis, and an output axis, and a spin axis of said rotor, with said spin axis and said input axis in a plane parallel to said platform, and said output axis coincident with said first axis; means for providing output pulses when said gyro inner cylinder exerts a torque about its output axis, with the polarity of said pulses dependent on the direction of said torque; means for rotating said inner cylinder of said gyro with respect to said outer housing in response to said output pulses, whereby said inner cylinder of said gyro tends to maintain a predetermined angular relationship with said outer housing and said platform as the platform rotates; adjustable means for providing a position pulse for each revolution of said platform; means connected both to said means for providing output pulses and to said adjustable means, for providing an indication of the angular displacement of said adjustment means from the north-south plane with respect to said first axis when it provides its position pulse.

2. The gyrocompass as defined in claim 1 wherein a number of positive output pulses are followed by an equal number of negative pulses for each revolution of said gyro about said first axis, and wherein said means connected includes means for counting the number of positive pulses from the time of said positive pulse to the start of said negative pulses.

3. The gyrocompass as defined in claim 2 wherein said means connected includes means for sensing positive output pulses and means for sensing negative output pulses with each means for sensing having an input connected to said means for providing and each further including an output; gate means having a signal input, a signal output, and control inputs, with the output of said means for sensing positive pulses connected to said signal input, and said adjustable means for providing connected to a first control input; an accumulator having a signal input connected to the signal output of said gate; a signal output, and a control input; a preset-reset having inputs and outputs; a printer having a control input and a signal input; said outputs of said means for sensing negative and said gate connected to inputs of said preset-reset, and respective outputs of said preset connected to a second control input of said gate, to said control input of said accumulator, and to said control input of said printer.

* * * * *